Aug. 14, 1956 R. L. BROWN 2,758,350
VARIABLE WIDTH MOLDING FASTENER

Filed Nov. 19, 1952

INVENTOR.
ROBERT L. BROWN
BY
HIS ATTORNEY

2,758,350
VARIABLE WIDTH MOLDING FASTENER

Robert L. Brown, Ferndale, Mich.

Application November 19, 1952, Serial No. 321,479

3 Claims. (Cl. 24—213)

This invention relates to a fastener and more particularly to a fastener for securing a molding to a support, especially adapted for securing internally flanged moldings which are tapered longitudinally or have transverse dimensions of different width.

It is an object of the present invention to provide a resilient fastener which is expansible and contractable laterally, that is, transversely movable relative to the panel to which the fastener is applied, whereby its transverse dimension may be varied to conform to the width of the supported member with which the fastener is to be used.

Another object of the invention is to provide a fastener having a portion which is transversely movable relative to its body portion, and to provide another portion of the fastener for spring pressure engagement with the transversely movable portion, whereby the latter is resiliently urged to the supporting member.

Other objects and advantages of the invention will more fully appear from the following description, taken in connection with the accompanying drawings in which.

Figure 1:
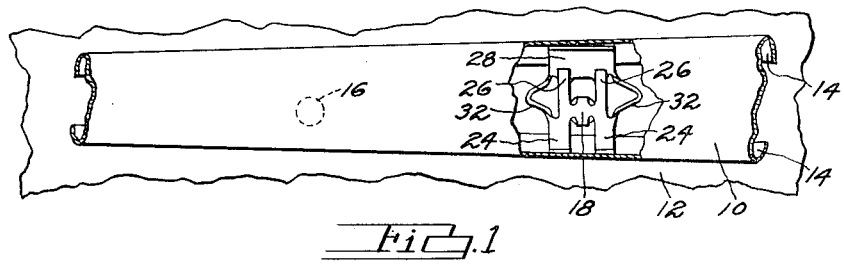
Fig. 1 is a fragmentary view of a molding applied to a support, a portion of the molding being broken away to show the improved fastener in its applied position for holding the molding to its support.
Figure 2:
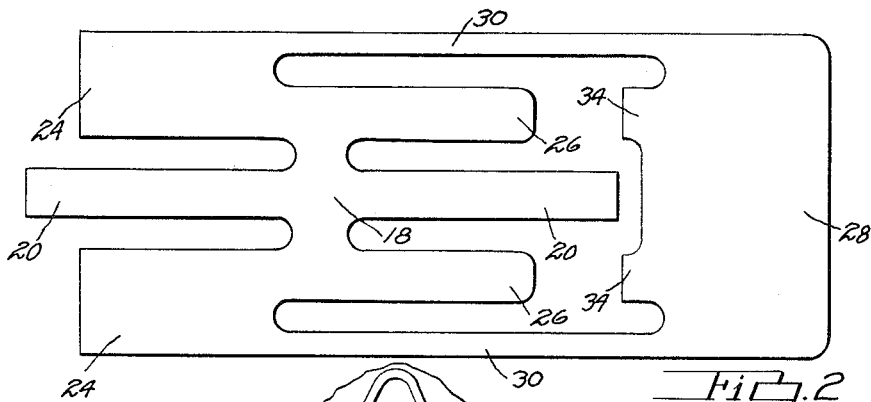
Fig. 2 is a top plan view of a sheet metal blank, from which the fastener is formed.
Figure 3:
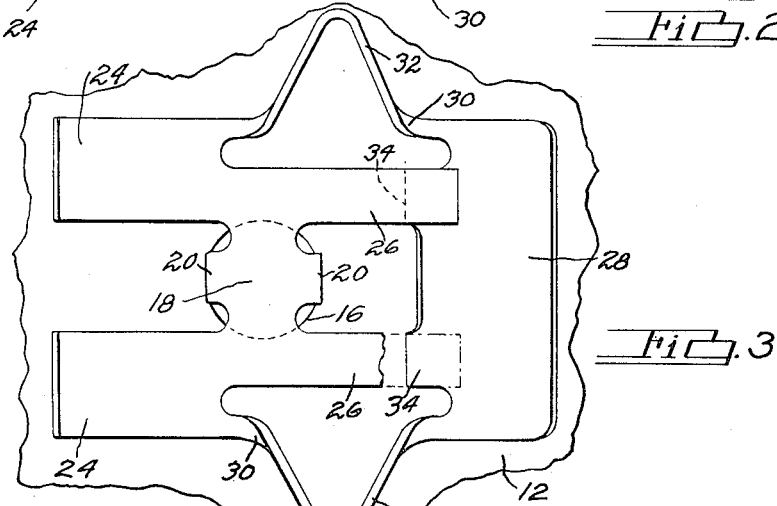
Fig. 3 is a top plan view of the fastener, after it has been formed.
Figure 4:
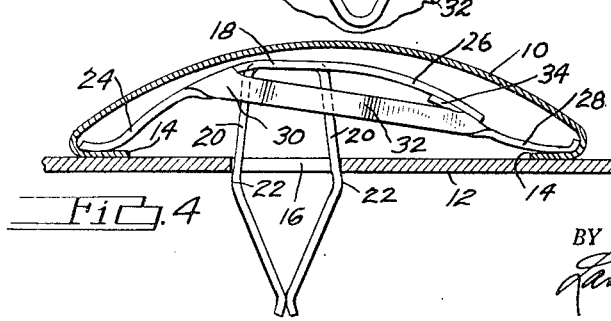
Fig. 4 is a side elevational view of Fig. 3, showing the fastener in applied position for holding a molding to a support, the molding and support being shown in section.

I have illustrated in Fig. 1, a longitudinally tapered molding 10 applied to a support 12. The molding 10, herein illustrated, is in the form of a channel having inwardly extending flanges 14 which receive the fastener for securing the molding to its support. The molding strips are often tapered longitudinally or have portions of unequal width throughout their length, thereby requiring fasteners of different size to fit within the channel of the molding.

Heretofore fasteners have been provided which were deformable or were provided with resilient tabs which would conform to the transverse dimension of the molding, but such fasteners, when designed for flexing transversely, did not have sufficient holding power in a direction for holding the molding on its support, and the fastener was not permitted to "breathe" transversely.

The improved fastener herein illustrated, utilizes two separate resilient means, one for permitting a variation in the width of the holding portions of the fastener, and another for urging the holding portions toward the support.

The fastener is preferably formed from sheet metal of spring steel, blanked and folded to finished form. These fasteners are adapted to be received in apertures 16 at spaced intervals along the supporting panel 12, and the molding flanges 14 are received between the support and anchoring portions of the fastener.

The fastener comprises a main body portion 18 having spaced downwardly extending legs 20. The portions of the legs 20, adjacent the body 18, diverge outwardly and the outer free end portions are bent to converge inwardly to provide shoulders 22 which are adapted to bear against the under edge of the apertures 16 when the fastener is in applied position. The legs 20 are resilient and the fastener is applied to the panel by pressing the legs into the aperture. The body 18 is provided with spaced outwardly extending holding arms 24 at one side thereof and a pair of outwardly extending arms 26 at the opposite side thereof. The arms 24, body portion 18, and arms 26 form an arch supporting the depending legs 20.

Extending outwardly beyond and below the arms 26 is a movable holding pad 28 which is integrally joined to the holding arms 24 by side bridge portions 30. The bridge portions 30 are twisted out of their normal plane at an angle approximately 90° and then bent outwardly at the mid portion of form resilient sections 32 of V shape. The bending operation draws the holding pad 28 inwardly and underneath the arms 26. Inward extensions 34 on the holding pad 28 bear against the arms 26 and are resiliently urged downwardly by the spring action of the arms 26. The holding pad 28 is free for sliding movement relative to the arms 26 as the sections 32 are sprung, either compressed or elongated. This action not only takes place during installation, but is present after assembly, permitting a "breathing" of the holding members and at the same time retains a downward holding force sufficient to firmly retain the molding to its supporting panel.

In the use of the fastener for securing a longitudinally tapered molding to a panel, the fastener at the wider portion of the molding is in its normal position with the holding flanges 24 in resilient engagement with one of the molding flanges 14, and with the holding pad 28 in engagement with the opposite molding flange 14. Due to the resiliency of the V sections 32, the holding pad 28 is moved toward or away from the arms 26, thereby increasing or decreasing the overall width of the fastener so that the holding flanges 24 and the holding pad 28, of the fastener, bear against the molding flanges 14 at points of a given width, and another fastener, of the same form, may be used at points of different molding flange width; the pad 28 being moved inwardly or outwardly against the spring tension of the V sections 32.

The spring tension of the V sections 32 is comparatively light as compared to the downward spring tension of the flanges 24 and 26 so that the holding pad 28 is easily moved inwardly and outwardly but is more firmly urged downwardly toward the molding flanges 14 by the resilient arms 26.

While the invention, herein illustrated and described, has been shown in its preferred embodiment, it will be understood that various changes including the size, shape and arrangement of parts may be made without departing from the spirit of my invention and it is my intention to include such reasonable changes within the scope of the appended claims.

I claim:

1. A fastener for holding a part to a support comprising, a body portion, means carried by said body portion for securing said body portion to a support, a resilient arm carried by said body portion for pressure engagement with the part to be held to its support, a hold down pad for pressure engagement with the part to be held to its support, resilient means connecting a portion of the fastener with said hold down pad to permit movement of said pad toward and away from said resilient arm, and a second resilient arm carried by said body portion in pressure engagement with said hold down pad for urging the part toward the support.

2. A fastener for holding a part to a support comprising, a body portion, means carried by said body portion for securing said body portion to a support, oppositely disposed resilient arms carried by said body portion for exerting a spring pressure in a direction for holding the part to its support, a pressure pad between one of said arms and the part to be supported, and resilient means connecting said pressure pad to the body of said fastener whereby the transverse position of said pad with respect to said last named arm may be varied.

3. A sheet metal fastener for holding a part to a support comprising, a body portion, means for retaining said body portion to a support, an arm projecting from said body portion for holding a part to its support, a pressure pad, a deformable bridge between said arm and said pressure pad, and resilient means carried by said body portion in pressure engagement with said pad for urging the pad toward the support.

References Cited in the file of this patent
UNITED STATES PATENTS 2,451,591    Tinnerman _____ Oct. 19, 1948